US009800851B2

(12) United States Patent
Goslin et al.

(10) Patent No.: US 9,800,851 B2
(45) Date of Patent: Oct. 24, 2017

(54) APPARATUS AND METHODS FOR BRINGING AN OBJECT TO LIFE

(71) Applicant: DISNEY ENTERPRISES, INC., Burbank, CA (US)

(72) Inventors: Michael P. Goslin, Burbank, CA (US); Eric Haseltine, Burbank, CA (US); Blade A. Olson, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 8 days.

(21) Appl. No.: 15/006,934

(22) Filed: Jan. 26, 2016

(65) Prior Publication Data
US 2017/0214896 A1 Jul. 27, 2017

(51) Int. Cl.
G03B 21/14 (2006.01)
H04N 9/31 (2006.01)
H04S 7/00 (2006.01)

(52) U.S. Cl.
CPC ........... *H04N 9/3194* (2013.01); *H04N 9/315* (2013.01); *H04N 9/3185* (2013.01); *H04N 9/3188* (2013.01); *G03B 21/147* (2013.01); *H04S 7/30* (2013.01)

(58) Field of Classification Search
CPC .... G03B 21/147; G03B 21/14; H04N 9/3179; H04N 9/3185; H04N 9/3194
USPC ............................................. 353/69, 70, 121
See application file for complete search history.

(56) References Cited

U.S. PATENT DOCUMENTS

| 6,554,431 B1* | 4/2003 | Binsted | H04N 9/3194 348/E5.137 |
| 2005/0083486 A1* | 4/2005 | Johnson | G03B 29/00 353/15 |
| 2010/0103386 A1* | 4/2010 | Kubota | H04N 9/3185 353/70 |
| 2011/0128511 A1* | 6/2011 | Ko | G03B 21/30 353/119 |

* cited by examiner

*Primary Examiner* — Ryan Howard
(74) *Attorney, Agent, or Firm* — Sheppard Mullin Richter & Hampton LLP

(57) ABSTRACT

This disclosure relates to apparatus and methods for bringing an object to life using a projection apparatus. An object may be augmented with a projected image by detecting a landmark associated with the object, determining a modified version of an image to compensate for an orientation of the projection apparatus to the landmark, and implementing a light generated by the projection apparatus to project the modified version of the image on a surface of the object.

20 Claims, 12 Drawing Sheets

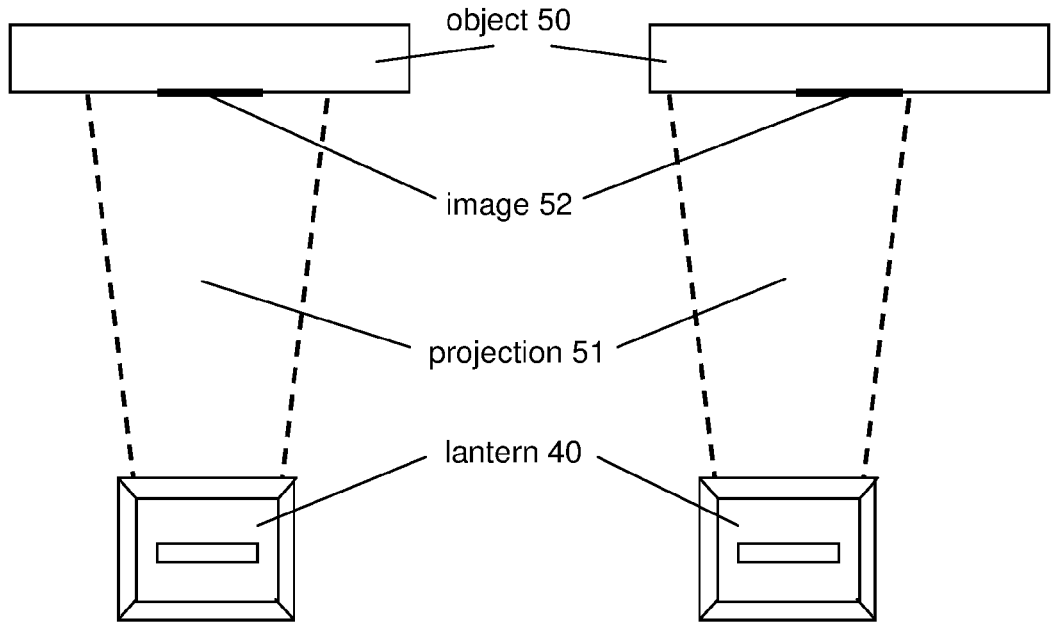
FIG. 5A          FIG. 5B
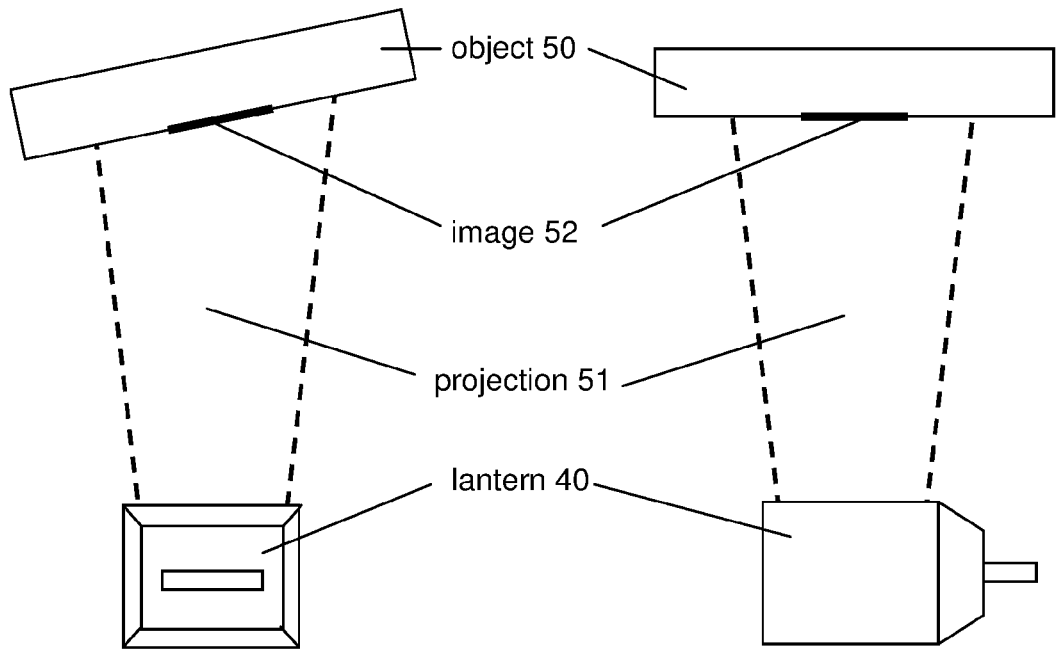
FIG. 5C          FIG. 5D

APPARATUS AND METHODS FOR BRINGING AN OBJECT TO LIFE

FIELD

This disclosure relates to apparatus and methods for bringing an object to life using light projection.

BACKGROUND

Projection systems allow a person to project an image or a video on a surface of an object. Such projection systems do not allow a person to augment the surface of the object so that the object appears to come to life.

SUMMARY

This disclosure relates to apparatus and methods for bringing an object to life using a projection apparatus. An object may be augmented with a projected image by detecting a landmark associated with the object, determining a modified version of an image to compensate for an orientation of the projection apparatus to the landmark, and implementing a light generated by the projection apparatus to project the modified version of the image on a surface of the object.

A projection apparatus may include one or more of a housing, a light source, an image sensor, an orientation sensor, one or more processors, and/or other components. One or more of the light source, image sensor, orientation sensor, one or more processors, and/or other components may be carried by the housing.

The light source may be configured to generate and project light on a surface of an object. The light source may be configured to project light within the field of view of the image sensor. The light source may include one or more sources of electro-magnetic radiation. The light source may include one or more image projectors, video projectors, slide projectors, and/or other light sources. The light source may use one or more of slide, film, digital light processing, liquid crystal display, liquid crystal on silicon, laser, and/or other projection technology.

The image sensor may be configured to generate visual output signals conveying visual information within a field of view of the image sensor. The field of view of the image sensor may be a function of the position and the orientation of the housing. The image sensor may include one or more of a charge-coupled device sensor, an active pixel sensor, a complementary metal-oxide semiconductor sensor, an N-type metal-oxide-semiconductor sensor, and/or other image sensors.

The orientation sensor may be configured to generate orientation output signals conveying orientation information of the housing. The orientation sensor may include one or more of an accelerometer, a magnetic field sensor, a gyroscope, an inertial measurement unit, and/or other orientation sensors.

The one or more processors may be configured to detect a landmark within the field of view of the image sensor. The one or more processors may detect the landmark based on the visual output signals. The landmark may be associated with the object. In some implementations, the landmark may include one or more of a label, a sticker, an augmented reality marker, a part of an object, an entire shape of an object, and/or other landmarks. In some implementations, the landmark may indicate a reference point for the object that facilitates determination of the orientation of housing relative to the landmark.

The one or more processors may be configured to determine a modified version of an image. The one or more processors may determine a modified version of an image based on the visual output signals and/or the orientation output signals. The one or more processors may determine a modified version of an image to compensate for an orientation of the housing relative to the landmark. In some implementations, the orientation of the housing relative to the landmark may include a distance between the housing and the landmark.

In some implementations, the projection apparatus may include a distance sensor. The distance sensor may be carried by the housing. The distance sensor may be configured to generate distance output signals conveying distance information relating to a distance between the housing and the object. In some implementations, a distance sensor may include one or more of a RF distance sensor, a Lidar, a IR distance sensor, and/or other distance sensors. The one or more processors may be configured to determine the modified version of the image based on the distance output signals.

In some implementations, the one or more processors may be configured to select the image based on one or more of a landmark, a user input received through an input device, and/or remotely received information. In some implementations, the one or more processors may be configured to animate the image. In some implementations, the one or more processors may be configured to animate the image based on one or more of the landmark, a user input received through an input device, and/or remotely received information.

The one or more processors may be configured to implement the light generated by the light source to project the modified version of the image on the surface of the object. In some implementations, the one or more processors may implement the light generated by the light source to project the modified version of the image on the same portion of the surface of the object. In some implementations, the modified image may be projected within a portion of a field of projection of the light source.

In some implementations, the projection apparatus may include an audio output. The audio output may be carried by the housing. In some implementations, the audio output may include one or more of a speaker, an audio jack, a wireless communication device coupled to a sound device, and/or other audio outputs. The one or more processors may be configured to effectuate operation of the audio output to generate audio based on the image. In some implementations, the audio generated by the audio output may be binaural audio that seems to originate from the object.

In some implementations, the projection apparatus may include a wireless communication device. The wireless communication device may be carried by the housing. The one or more processors may be configured to effectuate transmission of control output signals by the wireless communication device. In some implementations, the control output signals may be configured to effectuate operation of the object based on the projection of the image. In some implementations, the control output signals may be configured to effectuate operation of a second object based on the projection of the image.

These and other objects, features, and characteristics of the apparatus and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIGS. 5A-5D illustrate top-down views of different orientation examples between a projection apparatus and an object.

DETAILED DESCRIPTION

Figure 1:
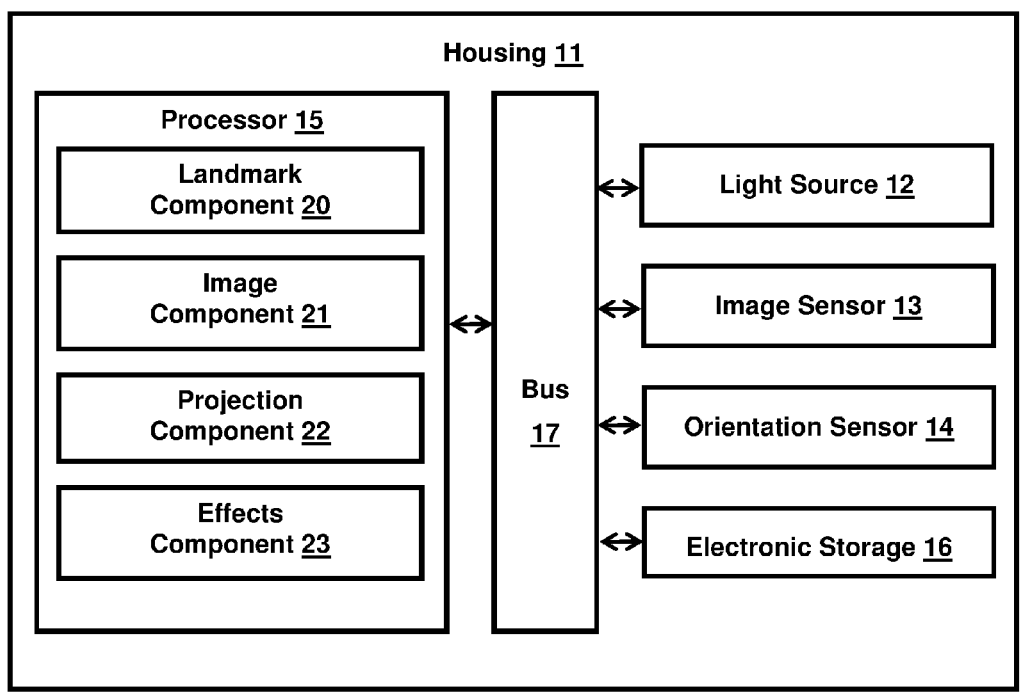
FIG. 1 illustrates a projection apparatus in accordance with one or more implementations.

FIG. 1 illustrates an projection apparatus 10. Projection apparatus 10 may include one or more of housing 11, light source 12, image sensor 13, orientation sensor 14, processor 15, electronic storage 16, bus 17 and/or other components. Housing 11 may be configured to carry (e.g., attach to, support, hold, and/or otherwise carry) one or more components of projection apparatus 10. Housing 11 may carry light source 12, image sensor 13, orientation sensor 14, processor 15, and/or other components. To augment an object with a projected image, a landmark associated with the object may be detected. The landmark may indicate a reference point for the object that facilitates determination of the orientation of housing 11 relative to the landmark. A modified version of an image may be determined to compensate for the orientation of housing 11 relative to the landmark. A light generated by light source 12 may be implemented to project the modified version of the image on a surface of the object.

Figure 3:
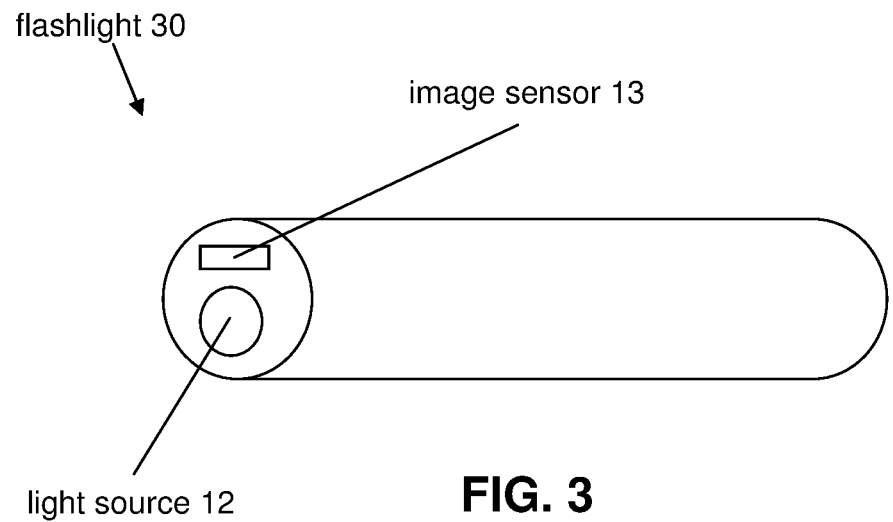
FIG. 3 illustrates a projection apparatus in a form of a flashlight in accordance with one or more implementations.
Figure 4:
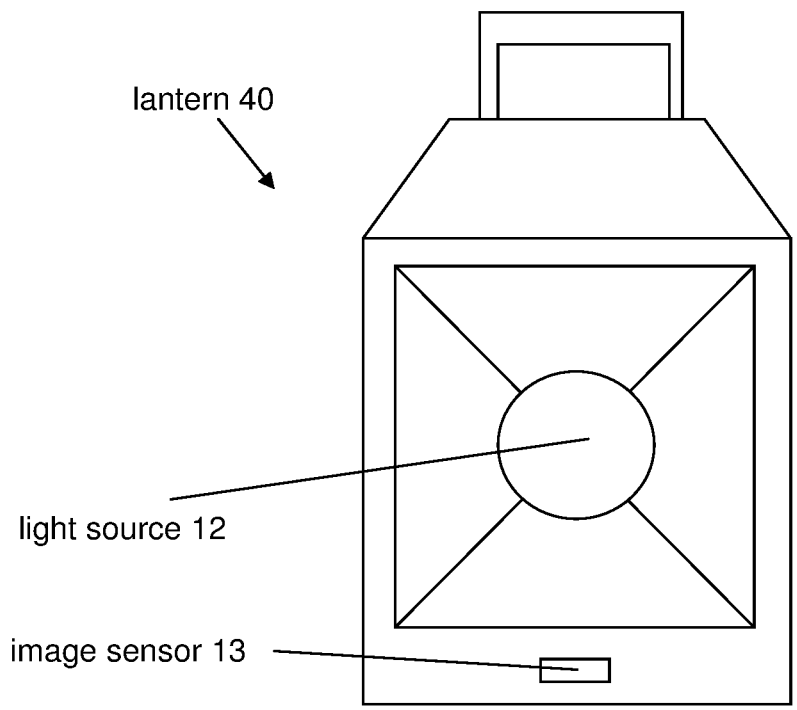
FIG. 4 illustrates a projection apparatus in a form of a lantern in accordance with one or more implementations.

Projection apparatus 10 may be shaped in different forms. Projection apparatus 10 may be shaped to be held by one or more hands. For example, projection apparatus 10 may be shaped to be handheld or may include a handle. As a non-limiting example, FIG. 3 illustrates projection apparatus 10 in a form of flashlight 30. Light source 12 is located at one end of flashlight 30, and image sensor 13 is located above light source 12. As another example, FIG. 4 illustrates projection apparatus 10 in a form of lantern 40. Light source 12 is located inside lantern 40 and image sensor 13 is located below light source. Other forms of projection apparatus 10 are contemplated. Other arrangements of light source 12 and image sensor 13 are contemplated.

In some implementations, projection apparatus 10 may include one or more gyroscopes. One or more gyroscopes may spin and resist rotation of projection apparatus 10 in certain directions. Such use of one or more gyroscopes may resist rapid rotation of projection apparatus 10.

Light source 12 may be configured to generate and project light on a surface of an object. Light source 12 may be configured to project light within a field of view of image sensor 13. Light source 12 may include one or more sources of electro-magnetic radiation. By way of non-limiting example, light source 12 may include one or more of image projectors, video projectors, slide projectors, film projectors, and/or other light sources. Light source 12 may include different components to project an image using light, and may include different components to project a modified image using light. As a non-limiting example, light source 12 may include one or more sources of light, optical elements such as mirrors, prisms and lens, image sources such as a film or digital image screen, and/or other components. Light source 12 may use one or more of slide, film, digital light processing, liquid crystal display, liquid crystal on silicon, laser, and/or other projection technology.

Image sensor 13 may be configured to generate visual output signals conveying visual information within the field of view of image sensor 13. Visual information may include one or more of an image, a video, and/or other visual information. The field of view of image sensor 13 may be a function of the position and the orientation of housing 11. When a landmark or an object is within the field of view of image sensor 13, visual information may include one or more of an image, a video, and/or other visual information regarding the landmark/object. Image sensor 13 may include one or more of a charge-coupled device sensor, an active pixel sensor, a complementary metal-oxide semiconductor sensor, an N-type metal-oxide-semiconductor sensor, and/or other image sensors.

Orientation sensor 14 may be configured to generate orientation output signals conveying orientation information of housing 11. Orientation information may characterize orientation of housing 11 a time, over a period of time, at a location, or over a range of locations. Orientation of housing 11 may include one of more of yaw, pitch, roll, and/or other orientation of housing 11. Orientation sensor 14 may include one or more of an accelerometer, a magnetic field sensor, a gyroscope, an inertial measurement unit, and/or other orientation sensors.

Electronic storage 16 may include electronic storage media that electronically stores information. Electronic storage 16 may store software algorithms, information determined by processor 15, information received remotely, and/or other information that enables projection apparatus 10 to function properly. For example, electronic storage 16 may store visual information (as discussed elsewhere herein), information relating to landmarks, information relating to objects, information relating to images, and/or other information.

Processor 15 may be configured to provide information processing capabilities in projection apparatus 10. As such, processor 15 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. Processor 15 may be configured to execute one or more computer program components. The computer program components may include one or more of landmark component 20, image component 21, projection component 22, effects component 23, and/or other components.

Landmark component 20 may be configured to detect a landmark within the field of view of image sensor 13. Landmark component 20 may detect the landmark based on the visual output signals conveying visual information within the field of view of image sensor 13. The landmark may be placed and/or otherwise located on the object. In some implementations, the landmark may include one or more of a label, a sticker, a barcode, a quick response code, an augmented reality marker, an object, and/or other landmarks.

The landmark may be associated with one or more characteristics of an object. Characteristics of an object may refer to one or more of temporal and/or permanent qualities of an object. For example, characteristics of an object may include one or more of object identifiers, object types, object size, object shape, objection location, object orientation, object color, objection operation status, and/or other object characteristics.

The landmark may indicate a reference point for the object that facilitates determination of the orientation of housing 11 relative to the landmark. The landmark may indicate a position and/or an orientation of an object surface on which projection apparatus 10 can project an image. The position and/or orientation (yaw, pitch, and/or roll) of the landmark may facilitate determination of the orientation of housing 11 relative to the landmark, which indicates the orientation of housing 11 relative to the object surface. Landmark component 20 may include or retrieve information (for example a database, etc.) that matches a detected landmark to a position and/or orientation of an object/surface of an object.

Figure 6A:
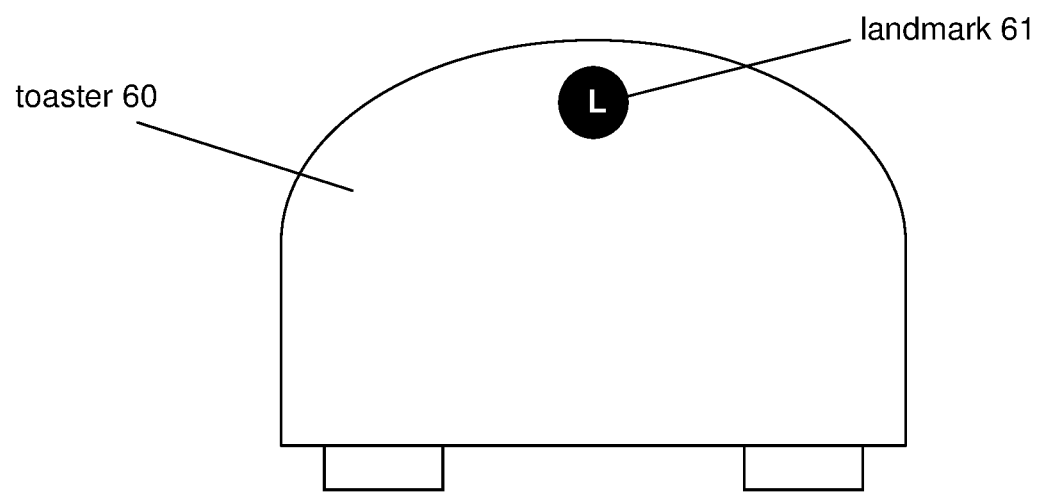
FIG. 6A illustrates a landmark on a surface of a toaster.

For example, a landmark may include an augmented reality marker indicating a position and an orientation of a surface of a toaster. As a non-limiting example, FIG. 6A illustrates toaster 60 and positioned on a surface of toaster 60 is landmark 61. Landmark component 20 may detect landmark 61 and find information in a database that indicates the position and/or the orientation of housing 11 with respect to a surface of toaster 60. While landmark 61 is shown to be positioned above the center of toaster 60 in FIG. 6A, this is not intended to be limiting.

Figure 9A:
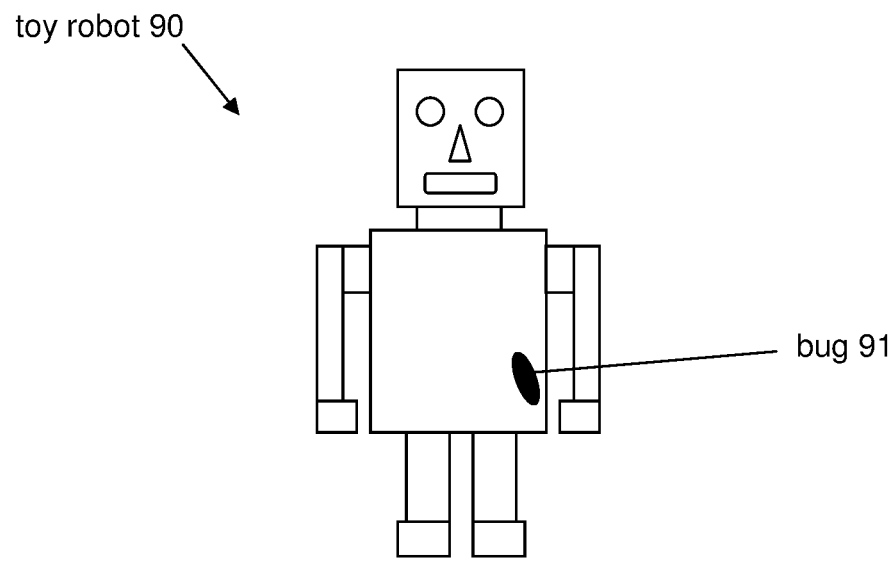
FIG. 9A illustrates a bug projected on a toy robot.

As another example, a landmark may include one or more parts of an object or the entire shape of an object. For example, FIG. 9A illustrates toy robot 90. One or more part of toy robot 90 or the entire shape of toy robot 90 may be a landmark for toy robot 90. Landmark component 20 may detect toy robot 90 and find information in a database that indicates the position and/or the orientation of housing 11 with respect to a surface of toy robot 90.

In some implementations, a user of projection apparatus 10 may designate an object/part of an object to be a landmark. For example, a user of projection apparatus 10 may point projection apparatus 10 so that the field of image sensor 13 includes toy robot 90. A user of projection apparatus 10 may designate one or more parts of toy robot 90 or the entire shape of toy robot 90 as a landmark via one or more user inputs received through one or more input devices, as described below.

Image component 21 may be configured to determine a modified version of an image. Image component 21 may determine a modified version of an image based on the visual output signals and/or the orientation output signals. Image component 21 may determine a modified version of an image to compensate for an orientation of the housing relative to the landmark.

For example, FIGS. 5A-5D illustrate top-down views of different orientation examples between lantern 40 and object 50. Object 50 may include a landmark in the middle of the surface of object 50 facing lantern 40.

In FIG. 5A, landmark component 20 may detect the landmark of object 50 based on the visual output signals and determine that the housing of lantern 40 is positioned directly in front of the landmark. Orientation sensor 14 may generate orientation output signals conveying orientation information indicating the housing of lantern 40 is leveled. Image component 21 may determine a modified version of an image based on the visual output signals and/or the orientation output signals to compensate for an orientation of the housing of lantern 40 relative to the landmark. For example, the image may be modified so that image 52 is projected on the surface of object 50 directly in front of lantern 40.

In FIG. 5B, landmark component 20 may detect the landmark of object 50 based on the visual output signals and determine that the housing of lantern 40 is positioned in front and to the right of the landmark. Orientation sensor 14 may generate orientation output signals conveying orientation information indicating the housing of lantern 40 is leveled. Image component 21 may determine a modified version of an image based on the visual output signals and/or the orientation output signals to compensate for an orientation of the housing of lantern 40 relative to the landmark. For example, the image may be modified so that image 52 is projected on the surface of object 50 in front and to the right of lantern 40 (in the same location as projected in FIG. 5A).

In FIG. 5C, landmark component 20 may detect the landmark of object 50 based on the visual output signals and determine that the housing of lantern 40 is positioned in front of the landmark and that the housing of lantern 40 is tilted with respect to the landmark. Orientation sensor 14 may generate orientation output signals conveying orientation information indicating the housing of lantern 40 is leveled. Image component 21 may determine a modified version of an image based on the visual output signals and/or the orientation output signals to compensate for an orientation of the housing of lantern 40 relative to the landmark.

Figure 5E:
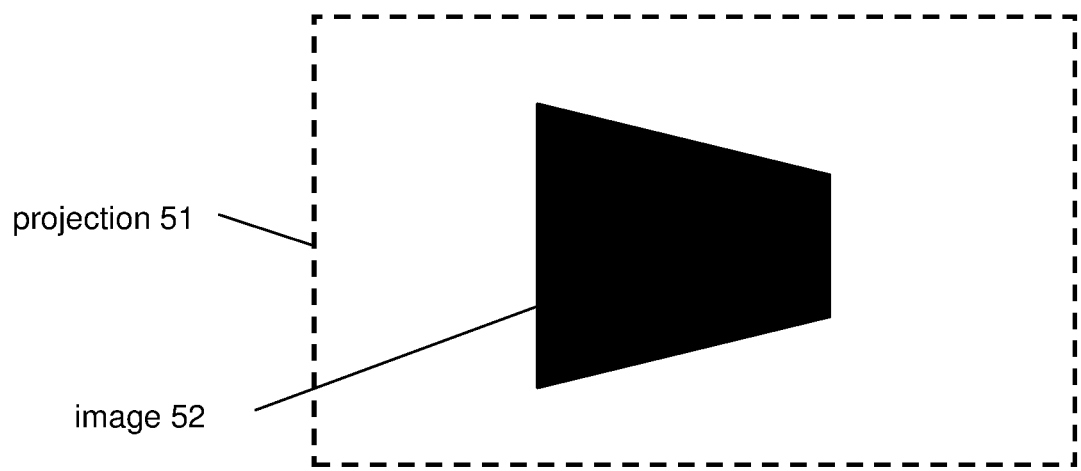
FIG. 5E illustrates an unmodified image projected on a surface of an object, where the projection apparatus and the object are arranged as shown in FIG. 5C.
Figure 5F:
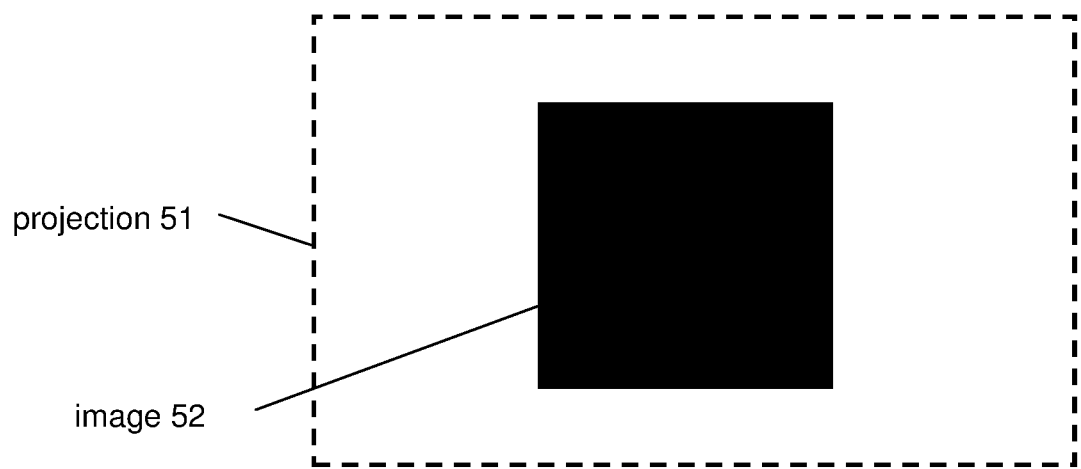
FIG. 5F illustrates a modified image projected on a surface of an object, where the projection apparatus and the object are arranged as shown in FIG. 5C.

For example, the image to be projected may be a square. When lantern 40 and object 50 are arranged as shown in FIG. 5A, image 52 may appear as a square shown in FIG. 5F. When lantern 40 and object 50 are arranged as shown in 5C, the image, without modification, may appear distorted on the surface of object 50. Because one side of object 50 is closer to lantern 40, image 52 may appear as a trapezoid (shown in FIG. 5E) instead of a square. The image may be modified to compensate for the orientation of lantern 40 relative to object 50 so that image 52 appears on the surface of object 50 as a square as shown in FIG. 5F.

In FIG. 5D, landmark component 20 may detect the landmark of object 50 based on the visual output signals and determine that the housing of lantern 40 is positioned in front of the landmark and that the housing of lantern 40 is rotated ninety-degrees to the right with respect to the landmark. Orientation sensor 14 may generate orientation output signals conveying orientation information indicating the housing of lantern 40 is rotated ninety-degrees to the right. Image component 21 may determine a modified version of an image based on the visual output signals and/or the orientation output signals to compensate for an orientation of the housing of lantern 40 relative to the landmark.

Figure 5G:
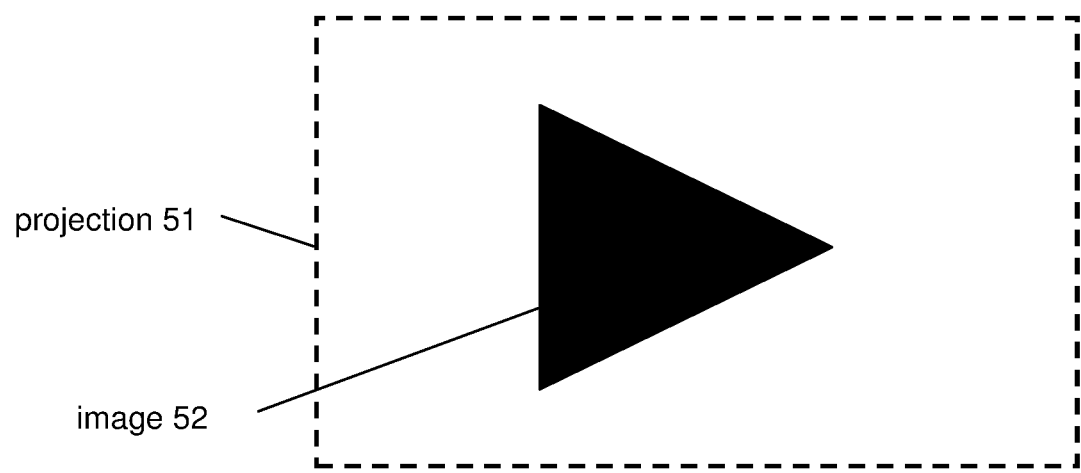
FIG. 5G illustrates an unmodified image projected on a surface of an object, where the projection apparatus and the object are arranged as shown in FIG. 5D.
Figure 5H:
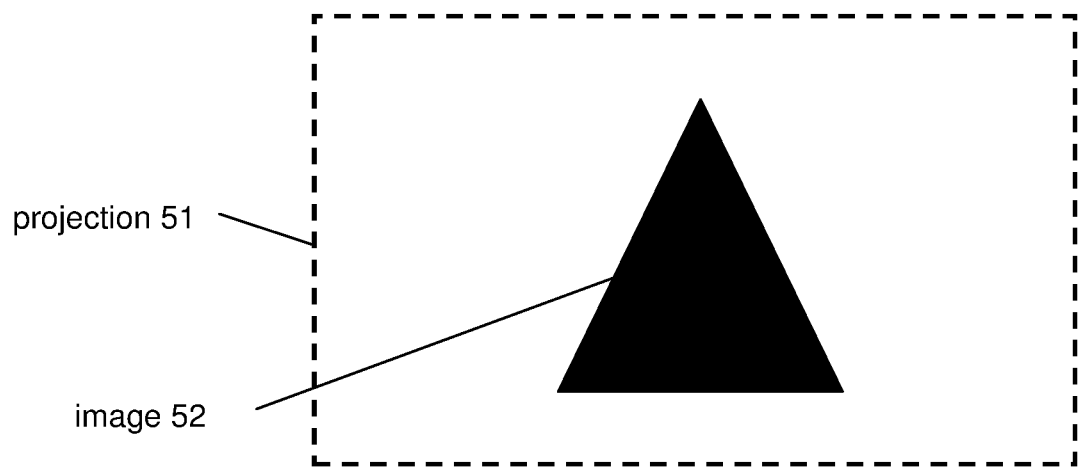
FIG. 5H illustrates a modified image projected on a surface of an object, where the projection apparatus and the object are arranged as shown in FIG. 5D.

For example, the image to be projected may be an upright triangle. When lantern 40 and object 50 are arranged as shown in FIG. 5A, image 52 may appear as an upright triangle shown in FIG. 5H. When lantern 40 and object 50 are arranged as shown in 5D, the image, without modification, may appear distorted on the surface of object 50. Because lantern 40 is rotated ninety-degrees to the right, image 52 may appear as a rotated triangle (shown in FIG. 5G) instead of an upright triangle. The image may be modified to compensate for the orientation of lantern 40 relative to object 50 so that image 52 appears on the surface of object 50 as an upright triangle shown in FIG. 5H.

In some implementations, image component 21 may determine a modified version of an image based on the visual output signals to compensate for an orientation of housing 11 relative to the landmark, where the orientation of housing 11 relative to the landmark includes a distance between housing 11 and the landmark. For example, landmark component 20 may determine the distance between housing 11 and the landmark based on the size of the landmark. Image component 21 may determine a modified version of the image where the modified version of the image is smaller or larger based on the distance between housing 11 and the object. For example, an image may be originally sized to be projected on a surface of an object a certain distance from housing 11 of projection apparatus 10. Image component 21 may modify an image to be larger based on the visual output signals indicating that housing 11 is further away from the surface of the object than the certain distance. Image component 21 may modify an image to be smaller based on the visual output signals indicating that housing 11 is closer to the surface of the object than the certain distance.

In some implementations, projection apparatus 10 may include a distance sensor. The distance sensor may be carried by housing 11. The distance sensor may be configured to generate distance output signals conveying distance information relating to a distance between housing 11 and the object. Distance information may characterize a distance between housing 11 and the object a time, over a period of time, at a location, or over a range of location. In some implementations, a distance sensor may include one or more of a RF distance sensor, a Lidar, a IR distance sensor, and/or other distance sensors.

Image component 21 may be configured to determine a modified version of the image based on the distance output signals. For example, image component 21 may modify an image to be larger based on the distance output signals indicating that housing 11 is further away from the surface of the object than a certain distance. As another example, image component 21 may modify an image to be smaller based on the distance output signals indicating that housing 11 is closer to the surface of the object than a certain distance.

In some implementations, image component 21 may be configured to select the image. Image component 21 may select the image based on one or more of a landmark, a user input received through an input device, remotely received information, and/or other information. For example, image component 21 may include or retrieve information (for example, a database, etc.) that matches a landmark to a particular image.

Figure 6B:
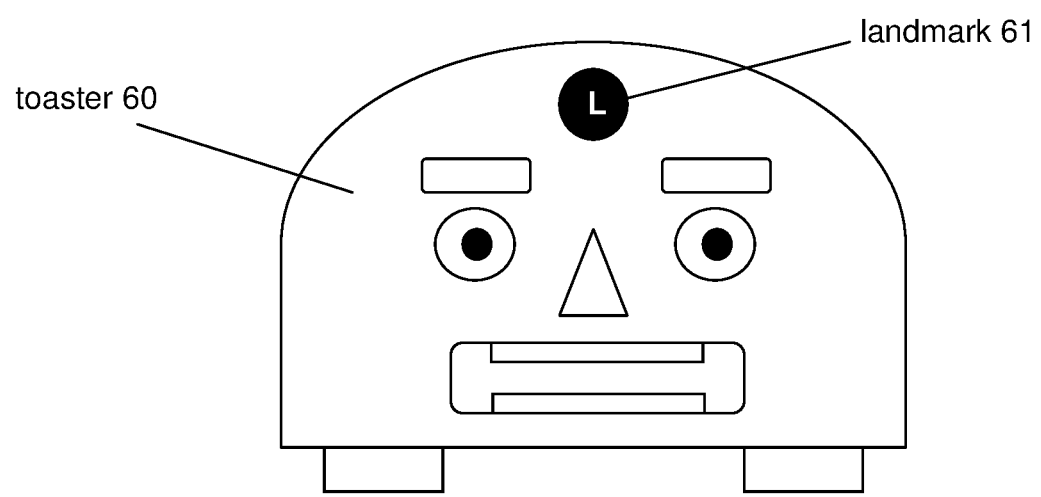
FIG. 6B illustrates a face projected on a surface of a toaster.
Figure 7A:
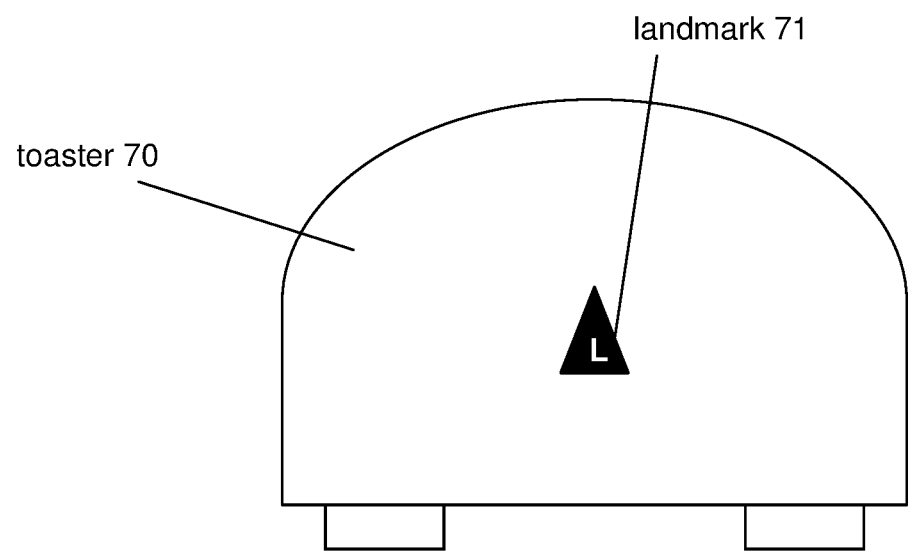
FIG. 7A illustrates a landmark on a surface of a toaster.
Figure 7B:
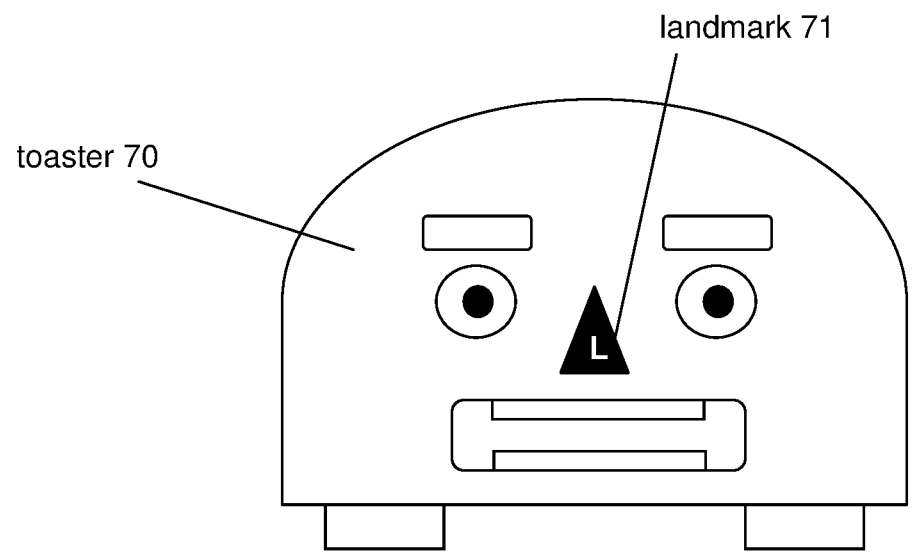
FIG. 7B illustrates a face projected on a surface of a toaster with a landmark forming a part of the face.

FIGS. 6A-7B illustrate non-limiting examples of images selected by image component 21 based on landmarks. In FIG. 6A, toaster 60 has landmark 61 above the center of a surface. Image component 21 may select a face with eyes, eyebrows, a nose, and a mouth based on landmark 61 for the surface of toaster 60 (shown in FIG. 6B). In FIG. 7A, toaster 70 has landmark 71 at the center of a surface. Image component 21 may select a face with eyes, eyebrows, and a mouth based on landmark 71 for the surface of toaster 70 (shown in FIG. 7B). In FIG. 7B, landmark 71 appears as a nose and forms a part of the face selected by image component 21.

Image component 21 may select the image based on a user input received through an input device. By way of non-limiting example, an input device may include one or more of a key entry device, a touch entry device, an imaging device, a sound device, and/or other input devices. A user input may refer to one or more information provided by a user through an input device.

A key entry device may include a device that allows a user to provide one or more user inputs by typing one or more of characters, numbers, and/or other symbols. A key entry device may include a separate device or a part of another device. For example, a key entry device may include a keyboard coupled to processor 15. As another example, a key entry device may include a mobile device coupled to processor 15. A user may provide one or more user inputs by typing one or more information. For example, a user may provide one or more user inputs by typing one or more information relating to type, shape, size, color, and/or other information about the image.

A touch entry device may include a device that allows a user to provide user inputs by touching a user interface of the touch entry device. A touch entry device may include a separate device or a part of another device. For example, a touch entry device may include a touch screen coupled to processor 15. As another example, a touch entry device may include a mobile device coupled to processor 15. A user may provide one or more user inputs by touching one or more portions of the touch entry device corresponding to one or more information. For example, a user may provide one or more user inputs by touching one or more portions of the touch entry device corresponding to one or more of type, shape, size, color, and/or other information about the image.

An imaging device may include a device that allows a user to provide user inputs by using an image sensor of the imaging device. An imaging device may include a separate device or a part of another device. For example, an imaging device may include an image sensor coupled to processor 15. As a non-limiting example, an imaging device may include image sensor 13. As another example, an imaging device may include a mobile device coupled to processor 15. A user may provide one or more user inputs by directing the field of view of the imaging device to objects that include information. For example, a user may provide one or more user inputs by directing the field of view of the imaging device to objects that include one or more of type, shape, size, color, and/or other information about the image.

A sound device may include a device that allows a user to provide user inputs through voice and/or sounds. A sound device may include a separate device or part of another device. For example, a sound device may include a microphone coupled to processor 15. As another example, a sound device may include a mobile device coupled to processor 15. A user may provide one or more user input by speaking one or more information. For example, a user may provide one or more user inputs by speaking one or more of type, shape, size, color, and/or other information about the image.

In some implementations, image component 21 may select the image based on remotely received information. For example, projection apparatus 10 may include a wireless communication device coupled to processor 15, and the wireless communication device may allow image component 21 to receive information relating to an image from another device. Image component 21 may be configured to select the image based on the information remotely received from projection apparatus 10.

Figure 8:
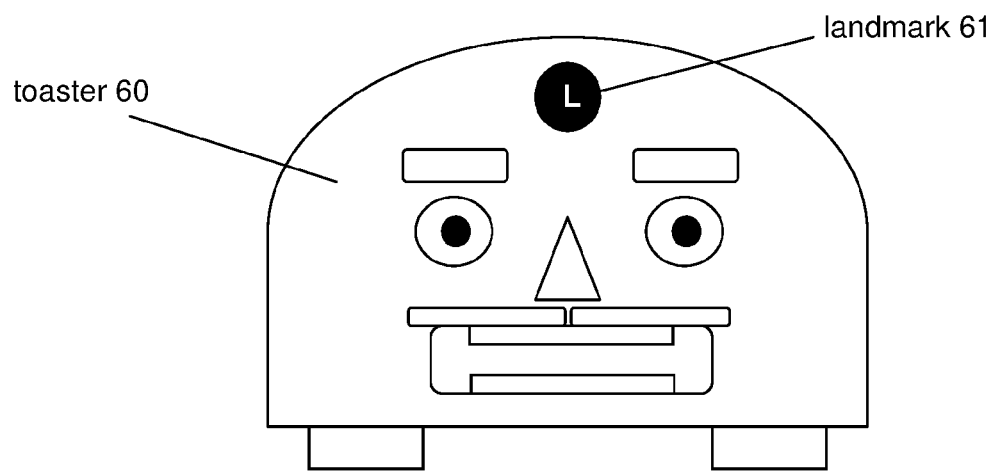
FIG. 8 illustrates a face and a mustache projected on a surface of a toaster.

For example, two projection apparatuses may be projecting images on toaster 60. The first projection apparatus may be projecting an image of a face on toaster 60, as shown in FIG. 6B. Image component 21 operating inside the second processor of the second projection apparatus may remotely receive information (for example, from the first projection apparatus) indicating that the first projection apparatus is projecting a face on toaster 60. Image component 21 operating inside the second processor of the second projection apparatus may select a mustache for the image, and toaster 60 may have both a face and a mustache projected by the two projection apparatuses (shown in FIG. 8). Alternatively, image component 21 operating inside the second processor of the second projection apparatus may remotely receive information indicating that it should select a mustache for the image. Other types of remotely received information are contemplated.

In some implementations, image component 21 may be configured to animate an image. Image component 21 may animate an image so that one or more parts of an image appears to be moving or changing. For example, image component 21 may animate one or more parts of the face selected for toaster 60 in FIG. 6B. For example, image component 21 may animate an eye of the face so that it looks like the face on toaster 60 is winking. As another example, image component 21 may animate the eyes of the face so that it looks like tears are falling from the eyes. As another example, image component 21 may animate the eyes, the eyebrows, and mouth of the face so that it looks like the face on toaster 60 is laughing. Other types of image animations are contemplated.

In some implementations, image component 21 may be configured to animate the image based on one or more of the landmark, a user input received through an input device, and/or remotely received information. For example, in FIG. 6B, image component 21 may, based on landmark 61, animate the face so that it looks like the face is laughing. As another example, image component 21 may, based on a user input received through an input device, animate the face so that it looks like the face is crying. As another example, image component 21 may, based on remotely received information, animate the face so that the it looks like the face is surprised.

Projection component 22 may be configured to implement the light generated by light source 12 to project the modified version of the image on the surface of the object. Projection component 22 may use one or more components of light source 12 to implement the light generated by light source 12 project the modified version of the image on the surface of the object. For example, projection component 22 may use one or more sources of light, optical elements such as mirrors, prisms and lens, image sources such as a film or digital image screen, and/or other components to implement the light generated by light source 12 project the modified version of the image on the surface of the object.

In some implementations, projection component 22 may implement the light generated by light source 12 to project the modified version of the image on the same portion of the surface of the object. For example, in FIG. 5A, lantern 40 is projecting image 52 in the center of a surface of object 50. In FIG. 5B, lantern 40 is still projecting image 52 in the center of the surface of object 50 when projection 51 has shifted to the left.

In some implementations, the modified image may be projected within a portion of a field of projection of the light source. For example, in FIGS. 5A-5D, image 52 is projected within a portion of a field of projection 51.

In some implementations, projection apparatus 10 may include an audio output. The audio output may be carried by housing 11. In some implementations, the audio output may include one or more of a speaker, an audio jack, a wireless communication device coupled to a sound device, and/or other audio outputs. Effects component 23 may be configured to effectuate operation of the audio output to generate audio based on the image. Audio may refer one or more information that may be observed audibly. Audio may be static or dynamic, and may be audibly observable at a time, over a period of time, at a location, or over a range of locations. As a non-limiting example, audio may include one or more of a sound, a music, a word, a sentence, and/or other audio. In some implementations, the audio generated by the audio output may be binaural audio that seems to originate from the object. The audio generated by the audio output may be binaural audio that seems to originate from toaster 60.

For example, in FIG. 6B, image component 21 may select a face as the image and animate the face projected on toaster 60 so that it looks like the face is talking or laughing. Effects component 23 may, based on the image, effectuate operation of the audio output to generate audio of toaster 60 talking or laughing. As another example, in FIG. 8, two projection apparatuses may be projecting an image of a face and an image of a mustache on a surface of toaster 60. The face may first be projected on toaster 60 by a first projection apparatus and the mustache may later be projected on toaster 60 by a second projection apparatus. When the second projection apparatus projects the mustache on toaster 60, effects component 23 of the first projection apparatus and/or the second projection apparatus may effectuate operation of the audio output to generate audio of toaster 60 talking about its new mustache. The audio generated by the audio output may be binaural audio that seems to originate from toaster 60.

In some implementations, projection apparatus 10 may include a wireless communication device. The wireless communication device may be carried by housing 11. Effects component 23 may be configured to effectuate transmission of control output signals by the wireless communication device. In some implementations, the control output signals may be configured to effectuate operation of the object based on the projection of the image at a time, over a period of time, at different times, at a location, over a range of locations, or at different locations.

Figure 9B:
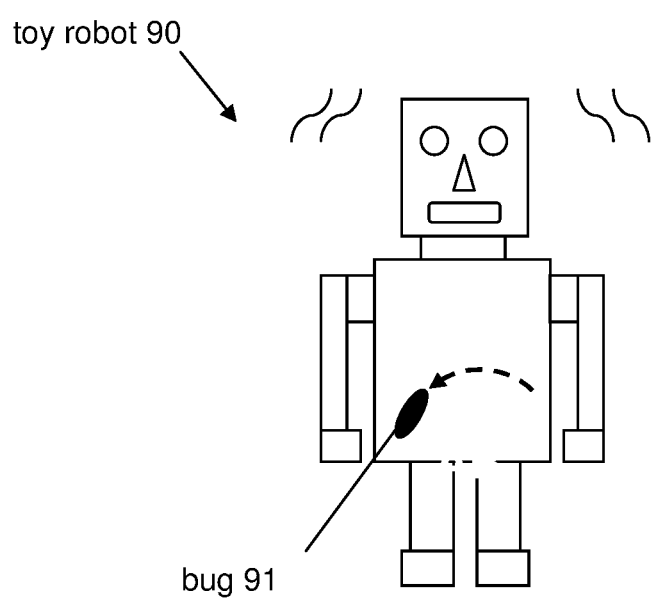
FIG. 9B illustrates a toy robot moving in response to the projected bug being moved around on the toy robot.

For example, in FIG. 9A, the landmark may be toy robot 90 and the image selected by the image component 21 may be bug 91. Projection component 22 may implement the light generated by light source 12 to project the modified version of bug 91 on the surface of toy robot 90. A user input received through an input device (for example, an action button, etc.) may allow a user to make changes to the image. For example, a user may press an action button, which allows the user to grab and move/manipulate the image. In FIG. 9B, a user may press the action button to grab bug 91 and move bug 91 in a circular motion on the surface of toy robot 90 (simulating bug 91 crawling on the surface of toy robot 90).

In response, effects component 23 may effectuate transmission of control output signals to toy robot 90. Control output signals may effectuate operation of robot 90. For example, the control output signals may effectuate operation of toy robot 90 to shake (simulating robot 90 shaking like he is ticklish). As another example, the control output signals may effectuate operation of toy robot 90 to make noises, such as giggling noises. As another example, the control output signals may effectuate operation of toy robot 90 to illuminate lighting on toy robot 90. As another example, the control output signals may effectuate operation of toy robot 90 to shake and make giggling noses. As another example, the control output signals may effectuate operation of toy robot 90 to look at or for bug 91 after a certain amount of time has passed since bug 91 moved on the surface of toy robot 90. Other types of operation of the object are contemplated.

Figure 10A:
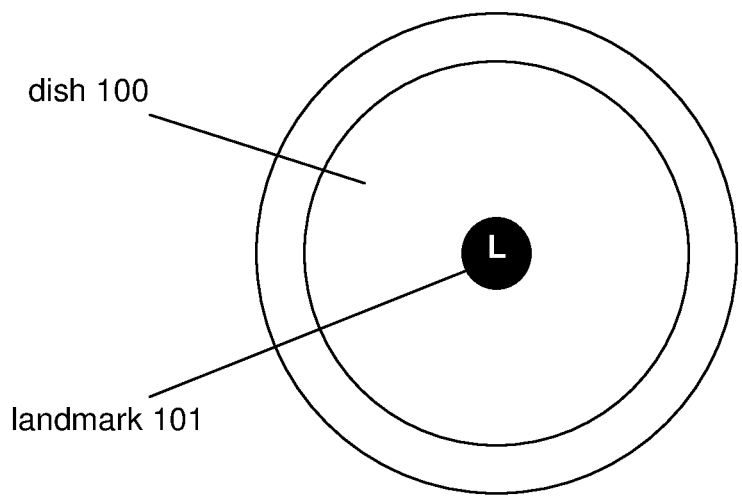
FIG. 10A illustrates a landmark on a surface of a dish.
Figure 10B:
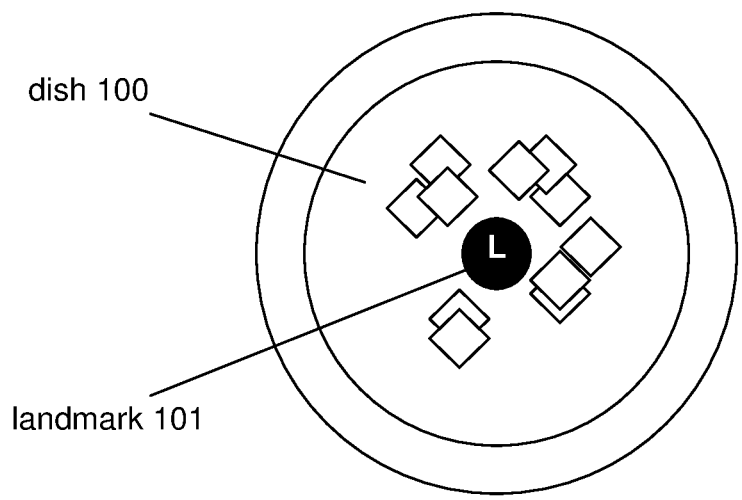
FIG. 10B illustrates treats projected on a surface of a dish.
Figure 10C:
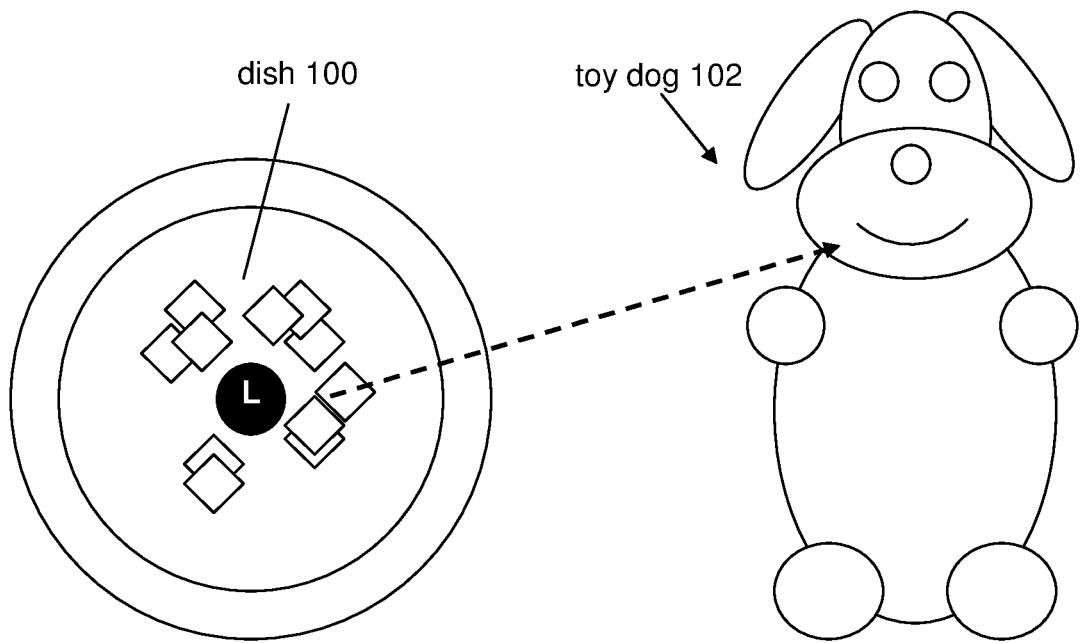
FIG. 10C illustrates moving a treat projected on a surface of a dish to a toy dog.
Figure 10D:
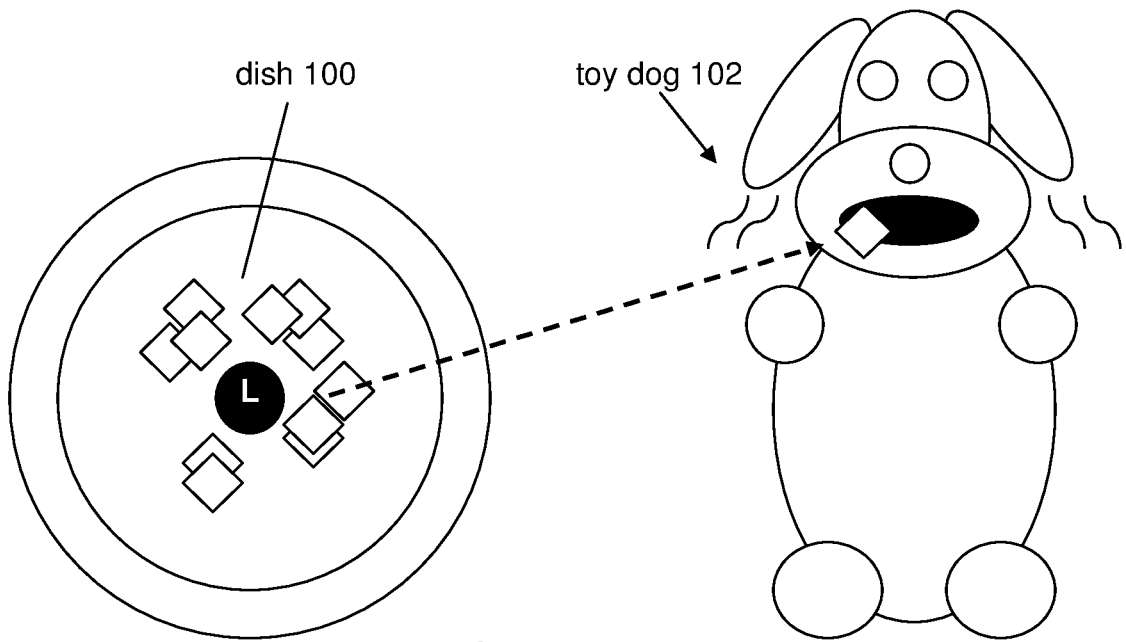
FIG. 10D illustrates a toy dog moving its mouth in response to the projected treat being placed on the mouth of the toy dog.

In some implementations, the control output signals may be configured to effectuate operation of a second object based on the projection of the image. For example, in FIG. 10A, landmark 101 is positioned in the center of dish 100. In FIG. 10B, image component 21 may select virtual treats as the image and projection component 22 may implement a light generated by light source 12 to project the modified image of virtual treats on dish 100. In FIG. 10C, a user input may be received through an input device, such as an action button on projection apparatus 10. For example, clicking on the action button may allow the user to "drag" one or more virtual treats from dish 100 to toy dog 102.

In response, effects component 23 may effectuate transmission of control output signals to toy dog 102. Control output signals may effectuate operation of toy dog 102. For example, the control output signals may effectuate operation of toy dog 102 to move its mouth (simulating toy dog 102 opening its mouth or eating one or more virtual treats). As another example, the control output signals may effectuate operation of toy dog 102 to make noises, such as eating noises. As another example, the control output signals may effectuate operation of toy dog 102 to move its mouth and make eating noises. As another example, the control output signals may effectuate operation of toy dog 102 to ask for more food after a certain amount of time has passed since the virtual treat was moved to toy dog 102. Other types of operation of the second object are contemplated.

In some implementations, effects component 23 may store information about transmitted control output signals. Information about transmitted control output signals may characterize the transmission of the control output signals a time, over a period of time, at a location, or over a range of locations. For example, information about transmitted control output signals may include the control output signals, the type(s) of control output signals, the time(s) of transmission, the location(s) of transmission, the identity of object(s) that received the transmission, and/or other information about the transmitted control output signals.

Effects component 23 may select control output signals based on the stored information about transmitted control output signals. For example, effects component 23 may store information about the transmission of the control output signals effectuating operation of toy dog 102 to move its mouth and make eating noises (eating control output signals). When toy dog 102 is later within the field of view of image sensor 13, effects component 23 may select control output signals based on the stored information about the transmitted eating control output signals. For example, if toy dog 102 is within the field of view of image sensor 13 within a short period of time since the transmission of the eating control output signals, effects component 23 may select control output signals that effectuates operation of toy dog 102 to smile and wag its tail. If toy dog 102 is within the field of view of image sensor 13 after a long time since the transmission of the eating control output signals, effects component 23 may select control output signals that effectuates operation of toy dog 102 to ask for more food. Other types of control output signals based on the stored information about transmitted control output signals are contemplated.

Although light source 12, image sensor 13, orientation sensor 14, processor 15, and electronic storage 16 are shown to be connected to a bus 17 in FIG. 1, any communication medium may be used to facilitate interaction between any components of projection apparatus 10. One or more components of projection apparatus 10 may communicate with each other through hard-wired communication, wireless communication, or both. For example, processor 15 may wirelessly communicate with image sensor 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although processor 15 is shown in FIG. 1 as a single entity, this is for illustrative purposes only. In some implementations, processor 15 may comprise a plurality of processing units. These processing units may be physically located within the same device, or processor 15 may represent processing functionality of a plurality of devices operating in coordination.

Processor 15 may be configured to execute one or more of landmark component 20, image component 21, projection component 22, effects component 23, and/or other components by software; hardware; firmware; some combination of software, hardware, and/or firmware; and/or other mechanisms for configuring processing capabilities on processor 15.

It should be appreciated that although landmark component 20, image component 21, projection component 22, and effects component 23 are illustrated in FIG. 1 as being co-located within a single processing unit, in implementations in which processor 15 comprises multiple processing units, one or more of landmark component 20, image component 21, projection component 22, and/or effects component 23 may be located remotely from the other computer program components.

The description of the functionality provided by the different computer program components 20, 21, 22, and/or 23 described herein is for illustrative purposes, and is not intended to be limiting, as any of computer program components 20, 21, 22, and/or 23 may provide more or less functionality than is described. For example, one or more of computer program components 20, 21, 22, and/or 23 may be eliminated, and some or all of its functionality may be provided by other computer program components 20, 21, 22, and/or 23. As another example, processor 15 may be configured to execute one or more additional computer program components that may perform some or all of the functionality attributed to one or more of computer program components 20, 21, 22, and/or 23.

Although light source 12 is depicted in FIG. 1 as a single element, this is not intended to be limiting. Light source 12 may include one or more light sources in one or more locations.

Although image sensor 13 is depicted in FIG. 1 as a single element, this is not intended to be limiting. Image sensor 13 may include one or more image sensors in one or more locations.

Although orientation sensor 14 is depicted in FIG. 1 as a single element, this is not intended to be limiting. Orientation sensor 14 may include one or more orientation sensors in one or more locations.

The electronic storage media of electronic storage 16 may be provided integrally (i.e., substantially non-removable) with one or more components of projection apparatus 10 and/or removable storage that is connectable to one or more components of projection apparatus 10 via, for example, a port (e.g., a USB port, a Firewire port, etc.) or a drive (e.g., a disk drive, etc.). Electronic storage 16 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. Electronic storage 16 may be a separate component within projection apparatus 10, or electronic storage 16 may be provided integrally with one or more other components of projection apparatus 10 (e.g., processor 15). Although electronic storage 16 is shown in FIG. 1 as a single entity, this is for illustrative purposes only. In some implementations, electronic storage 16 may comprise a plurality of storage units. These storage units may be physically located within the same device, or electronic storage 16 may represent storage functionality of a plurality of devices operating in coordination.

Figure 2:
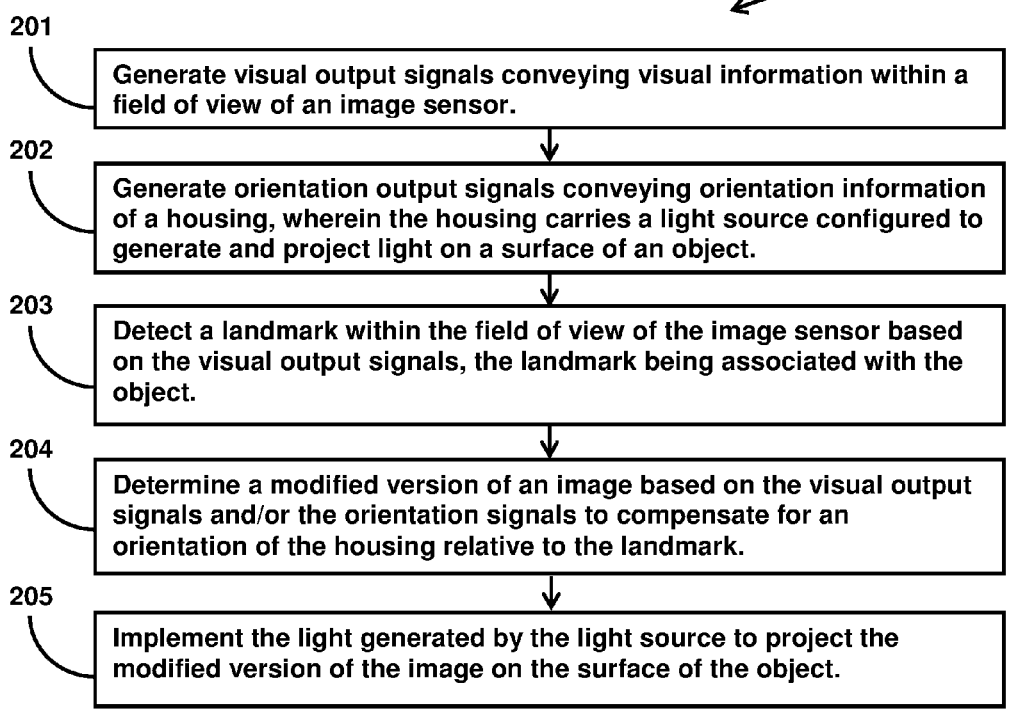
FIG. 2 illustrates a method to use a projection apparatus in accordance with one or more implementations.

FIG. 2 illustrates method 200 for bringing an object to life using light projection. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 200 in response to instructions stored electronically on one or more electronic storage mediums. The one or more processing devices may include one or more devices configured through hardware, firmware, and/or software to be specifically designed for execution of one or more of the operations of method 200.

Referring to FIG. 2 and method 200, at operation 201, visual output signals conveying visual information within a field of view of an image sensor may be generated. Visual information may include one or more of an image, a video, and/or other visual information. In some implementations, operation 201 may be performed by one or more sensors the same as or similar to image sensor 13 (shown in FIG. 1 and described herein).

At operation 202, orientation output signals conveying orientation information of a housing may be generated. The housing may carry a light source configured to generated and project light on a surface of an object. In some implementations, operation 202 may be performed by one or more sensors the same as or similar to orientation sensor 14 (shown in FIG. 1 and described herein).

At operation 203, a landmark within the field of view of the image sensor may be detected. The landmark may be associated with the object. The landmark may be detected based on the visual output signals. The landmark may indicate a reference point for the object that facilitates determination of the orientation of the housing relative to the landmark. In some implementations, operation 203 may be performed by a processor component the same as or similar to landmark component 20 (shown in FIG. 1 and described herein).

At operation 204, a modified version of an image may be determined. The modified version of the image may be determined based on the visual output signals and/or the orientation output signals. The modified version of the image may be determined to compensate for an orientation of the housing relative to the landmark. In some implementations, operation 204 may be performed by a processor component the same as or similar to image component 21 (shown in FIG. 1 and described herein).

At operation 205, the light generated by the light source may be implemented to project the modified version of the image on the surface of the object. In some implementations, operation 205 may be performed by a processor component the same as or similar to projection component 22 (shown in FIG. 1 and described herein).

Although the apparatus(es) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:
1. A projection apparatus comprising:
a housing;
a light source carried by the housing, the light source configured to generate and project light on a surface of an object;

an image sensor carried by the housing, the image sensor configured to generate visual output signals conveying visual information within a field of view of the image sensor;

an orientation sensor carried by the housing, the orientation sensor configured to generate orientation output signals conveying orientation information of the housing;

a wireless communication device carried by the housing; and one or more processors carried by the housing, the one or more processors configured by machine readable instructions to:

detect a landmark within the field of view of the image sensor based on the visual output signals, the landmark being associated with the object;

determine a modified version of an image based on at least one of the visual output signals or the orientation signals to compensate for an orientation of the housing relative to the landmark;

implement the light generated by the light source to project the modified version of the image on the surface of the object; and effectuate transmission of control output signals by the wireless communication device, the control output signals configured to effectuate operation of the object based on the projection of the image.

2. The projection apparatus of claim 1, further comprising an audio output carried by the housing, wherein the one or more processors are further configured to effectuate operation of the audio output to generate audio based on the image.

3. The projection apparatus of claim 2, wherein the audio generated by the audio output is binaural audio that seems to originate from the object.

4. The projection apparatus of claim 1, further comprising a distance sensor carried by the housing, the distance sensor configured to generate distance output signals conveying distance information relating to a distance between the housing and the object, wherein the one or more processors are further configured to determine the modified version of the image based on the distance output signals.

5. The projection apparatus of claim 1, wherein the one or more processors are further configured to select the image based on at least one of the landmark, a user input received through an input device, or remotely received information.

6. The projection apparatus of claim 1, wherein the one or more processors are further configured to animate the image.

7. The projection apparatus of claim 1, wherein the one or more processors are further configured to animate the image based on at least one of the landmark, a user input received through an input device, or remotely received information.

8. A projection apparatus comprising:
a housing;
a light source carried by the housing, the light source configured to generate and project light on a surface of an object;
an image sensor carried by the housing, the image sensor configured to generate visual output signals conveying visual information within a field of view of the image sensor;
an orientation sensor carried by the housing, the orientation sensor configured to generate orientation output signals conveying orientation information of the housing;
a wireless communication device carried by the housing; and
one or more processors carried by the housing, the one or more processors configured by machine readable instructions to:
detect a landmark within the field of view of the image sensor based on the visual output signals, the landmark being associated with the object;
determine a modified version of an image based on at least one of the visual output signals or the orientation signals to compensate for an orientation of the housing relative to the landmark;
implement the light generated by the light source to project the modified version of the image on the surface of the object; and
effectuate transmission of control output signals by the wireless communication device, the control output signals configured to effectuate operation of a second object based on the projection of the image.

9. The projection apparatus of claim 8, further comprising an audio output carried by the housing, wherein the one or more processors are further configured to effectuate operation of the audio output to generate audio based on the image.

10. The projection apparatus of claim 8, wherein the one or more processors are further configured to animate the image.

11. A method for using a projection apparatus, the method comprising:
generating visual output signals conveying visual information within a field of view of an image sensor;
generating orientation output signals conveying orientation information of a housing, wherein the housing carries a light source configured to generate and project light on a surface of an object;
detecting a landmark within the field of view of the image sensor based on the visual output signals, the landmark being associated with the object;
determining a modified version of an image based on at least one of the visual output signals or the orientation signals to compensate for an orientation of the housing relative to the landmark;
implementing the light generated by the light source to project the modified version of the image on the surface of the object; and
transmitting control output signals via a wireless communication device, the control output signals configured to effectuate operation of the object based on the projection of the image.

12. The method of claim 11, further comprising operating an audio output to generate audio based on the image.

13. The method of claim 12, wherein the audio generated by the audio output is binaural audio that seems to originate from the object.

14. The method of claim 11, further comprising generating distance output signals conveying distance information relating to a distance between the housing and the object, wherein the modified version of the image is further determined based on the distance output signals.

15. The method of claim 11, further comprising selecting the image based on at least one of the landmark, a user input received through an input device, or remotely received information.

16. The method of claim 11, further comprising animating the image.

17. The method of claim 11, further comprising animating the image based on at least one of the landmark, a user input received through an input device, or remotely received information.

18. A method for using a projection apparatus, the method comprising:
- generating visual output signals conveying visual information within a field of view of an image sensor;
- generating orientation output signals conveying orientation information of a housing, wherein the housing carries a light source configured to generate and project light on a surface of an object;
- detecting a landmark within the field of view of the image sensor based on the visual output signals, the landmark being associated with the object;
- determining a modified version of an image based on at least one of the visual output signals or the orientation signals to compensate for an orientation of the housing relative to the landmark;
- implementing the light generated by the light source to project the modified version of the image on the surface of the object; and
- transmitting control output signals via a wireless communication device, the control output signals configured to effectuate operation of a second object based on the projection of the image.

19. The method of claim 18, further comprising operating an audio output to generate audio based on the image.

20. The method of claim 18, further comprising animating the image.

* * * * *